United States Patent
Kang et al.

(10) Patent No.: US 6,948,181 B2
(45) Date of Patent: Sep. 20, 2005

(54) DISC CARTRIDGE (75) Inventors: Heui-jong Kang, Gyeonggi-do (KR);
Jae-yong Eum, Gyeonggi-do (KR);
Han-kook Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 312 days.

(21) Appl. No.: 10/175,911

(22) Filed: Jun. 21, 2002

(65) Prior Publication Data
US 2002/0196730 A1 Dec. 26, 2002

(30) Foreign Application Priority Data
Jun. 22, 2001 (KR) ......................................... 2001-35759

(51) Int. Cl.[7] ............................................. G11B 23/03
(52) U.S. Cl. ....................................................... 720/738
(58) Field of Search ................................. 360/133, 132;
720/738, 739, 740, 741, 742, 743, 744,
731; 369/291, 289

(56) References Cited

U.S. PATENT DOCUMENTS 4,991,048 A  * 2/1991  Ikebe et al. ............... 360/133
5,671,212 A  * 9/1997  Miyazaki et al. .......... 369/291
5,889,639 A  * 3/1999  Swanson et al. ........... 360/133
6,243,355 B1 * 6/2001  Ikebe et al. ............... 369/291
6,407,981 B1 * 6/2002  Cho et al. .................. 369/289
6,430,147 B1 * 8/2002  Goto et al. ................. 369/289

FOREIGN PATENT DOCUMENTS

| JP | 5-342795 | 12/1993 |
| JP | 10-64221 | 3/1998 |
| JP | 2000-30398 | 1/2000 |

OTHER PUBLICATIONS

First Office Action from Chinese patent office.

* cited by examiner

Primary Examiner—Tianjie Chen
(74) Attorney, Agent, or Firm—Stein, McEwen & Bui, LLP

(57) ABSTRACT

A disc cartridge includes a shutter unit having an outer shutter and inner shutters to open and shut apertures on the disc cartridge. The outer shutter opens one of the inner shutters corresponding to a side of the disc cartridge being accessed by a pickup. Accordingly, the overall area of the apertures exposed to the exterior during information recording and reproducing operations is reduced. Accordingly, dust is less likely to enter into the disc cartridge.

22 Claims, 7 Drawing Sheets

DISC CARTRIDGE

CROSS-REFERENCE TO RELATED APPLICATIONS

This application claims the benefit of Korean Patent Application No. 2001-35759 filed on Jun. 22, 2001, in the Korean Industrial Property Office, the disclosure of which is incorporated herein by reference.

BACKGROUND OF THE INVENTION

1. Field of the Invention

The present invention relates to a disc cartridge for receiving an information recording/reproducing medium, such as a disc, and more particularly, to a disc cartridge which prevents dust from entering into the disc cartridge.

2. Description of the Related Art

Figure 1:
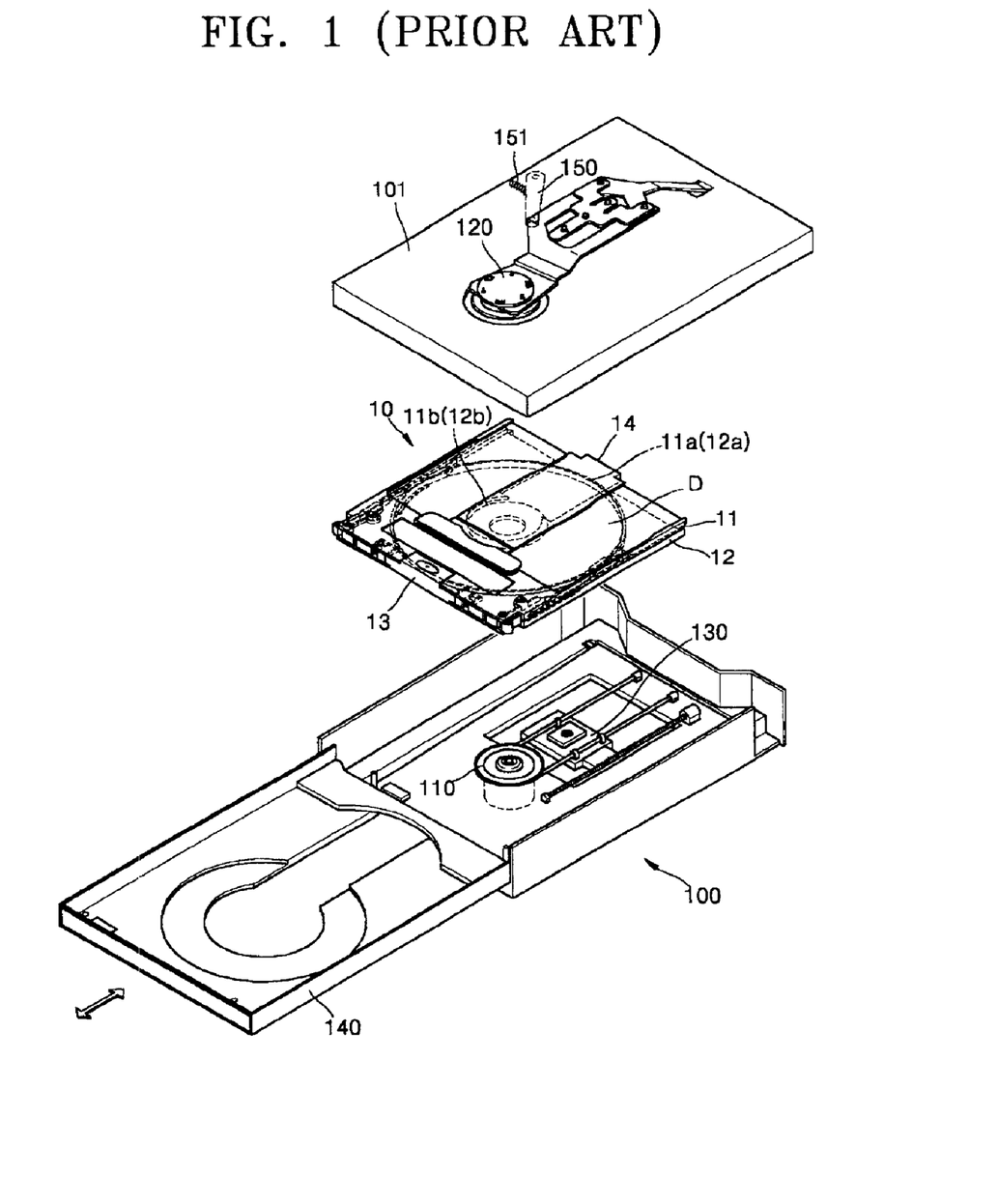
FIG. 1 illustrates a conventional disc cartridge and an exploded perspective view of an information recording and reproducing apparatus.
Figure 2:
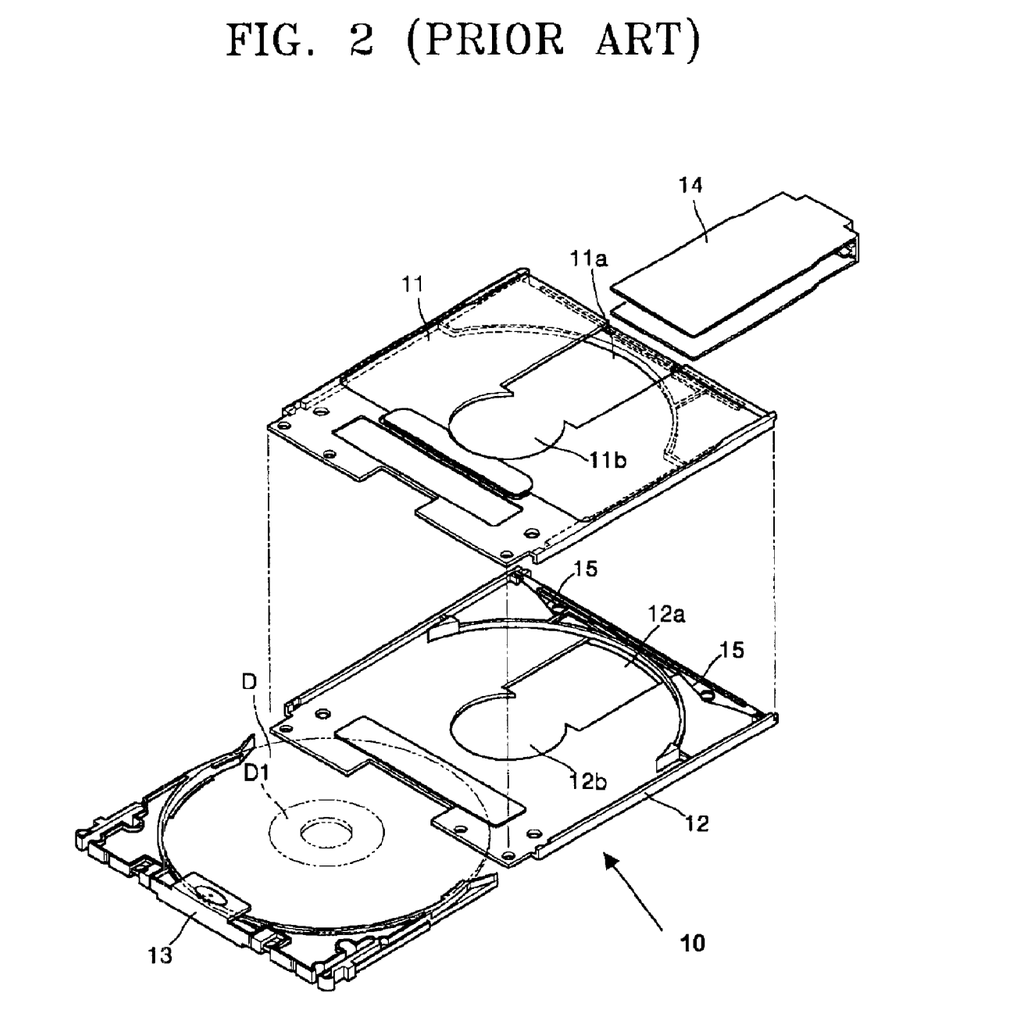
FIG. 2 is an exploded perspective view of the disc cartridge shown in FIG. 1.

FIGS. 1 and 2 show a conventional disc cartridge 10 for receiving a disc D to be used in an information reproducing apparatus 100. The disc cartridge 10 includes upper and lower cases 11 and 12 which form an internal space to receive the disc D, a holder 13 which is inserted into and combined with the upper and lower cases 11 and 12 while holding the disc D, and a shutter 14 which selectively opens and shuts apertures 11a and 12a, which are formed on the upper and lower cases 11 and 12 of the disc cartridge 10. The apertures 11a and 12a allow a pickup 130 of the information recording apparatus 100 to access the disc D.

Receiving openings 11b and 12b are formed to be connected with the apertures 11a and 12a, so as to allow a clamping domain D1 of the disc D to be clamped by a turntable 110 and a damper 120 of the information recording apparatus 100. The receiving openings 11b and 12b, similarly to the apertures 11a and 12a, are open or shut through opening or shutting of the shutter 14.

Figure 3A:
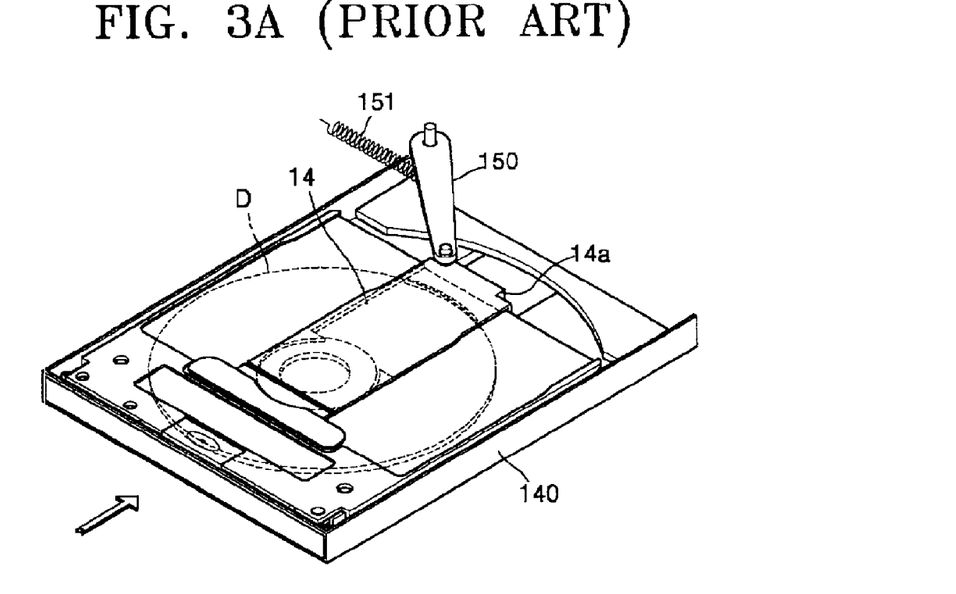
FIGS. 3A and 3B are perspective views illustrating an opening operation of a shutter of the disc cartridge shown in FIG. 1.
Figure 3B:
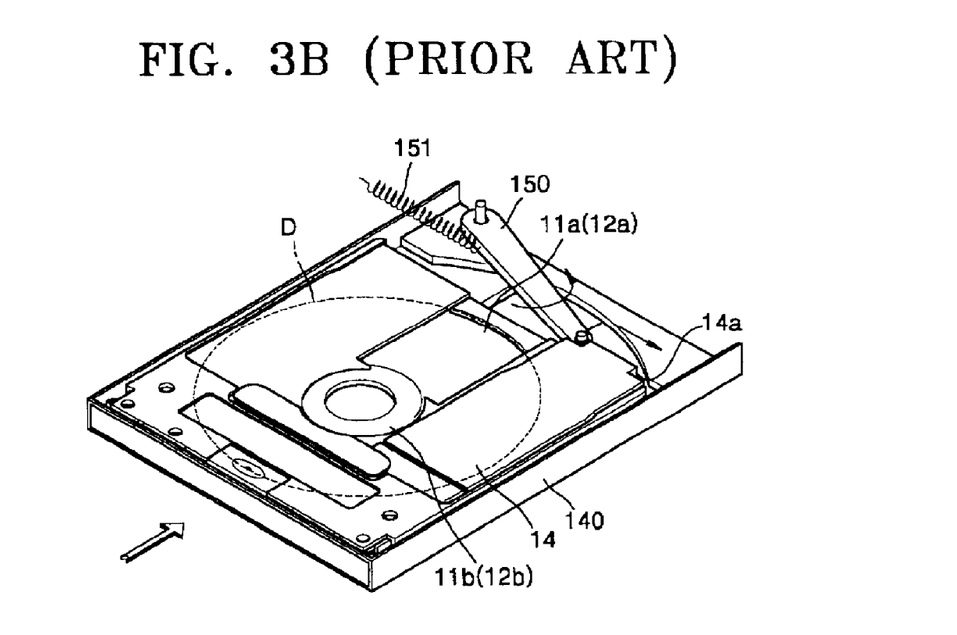

FIGS. 3A and 3B show an opening operation of the shutter 14 of the disc cartridge 10. The reference numeral 150 denotes an opening lever installed in a cover 101 of the information recording apparatus 100, which opens and shuts the shutter 14. As shown in FIGS. 3A and 3B, with reference to FIG. 1, where the disc cartridge 10 is inserted into the information recording apparatus 100, one end of the opening lever 150 is locked into a locking sill 14a of the shutter 14. As the lever 150 is rotated, the shutter 14 is thereby opened. A spring 151 provides a return force to return the opening lever 150 to an original position as the disc cartridge 10 is ejected from the information recording apparatus 100.

Since the disc D can be single-sided or double-sided, the upper and lower cases 11 and 12 of the disc cartridge 10 are formed symmetrical to each other, and allow both sides of the disc D to be used. In other words, with reference to FIG. 2, the apertures 11a and 12a and the receiving openings 11b and 12b are identical and are formed symmetrically on the upper and lower cases 11 and 12, so as to allow the pickup 130 to access one side of the disc D or the other side of the disc D in response to turning of the disc cartridge 10 upside down/right side up.

The main reason why the disc D is used while being encased in the disc cartridge 10 is to protect it from alien substances such as dust. That is, an alien substance such as dust can attach itself to a surface of the disc D and obstruct an accurate signal processing operation during information recording and reproducing operations. This problem is compounded especially in the case of a high-density disc. However, it is inevitable that dust enters the disc cartridge 10, through the upper and lower apertures 11a and 12a, because the shutter 14 must be opened to allow the pickup 130 to access the disc D during the information recording or reproducing operations. With the conventional disc cartridge 10, an aperture of the unused side of the disc D, 11a/12a which is not being accessed by the pickup 130, is, nevertheless, completely opened by the opening of the shutter 14. Therefore, the conventional disc cartridge 10 allows a lot of dust to build up in the apertures 11a and 12a. Accordingly, measures to prevent such a problem are needed.

SUMMARY OF THE INVENTION

Accordingly, it is an object of the present invention to provide an improved disc cartridge which prevents dust from entering into the disc cartridge.

Additional objects and advantages of the invention will be set forth in part in the description which follows and, in part, will be obvious from the description, or may be learned by practice of the invention.

To achieve the above and other objects of the present invention, there is provided a disc cartridge for receiving a disc, comprising a case which receives the disc and a shutter unit which selectively opens and closes apertures formed on the case according to sliding directions of the shutter unit, wherein the shutter unit comprises a double-layer structure of inner shutters and an outer shutter.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
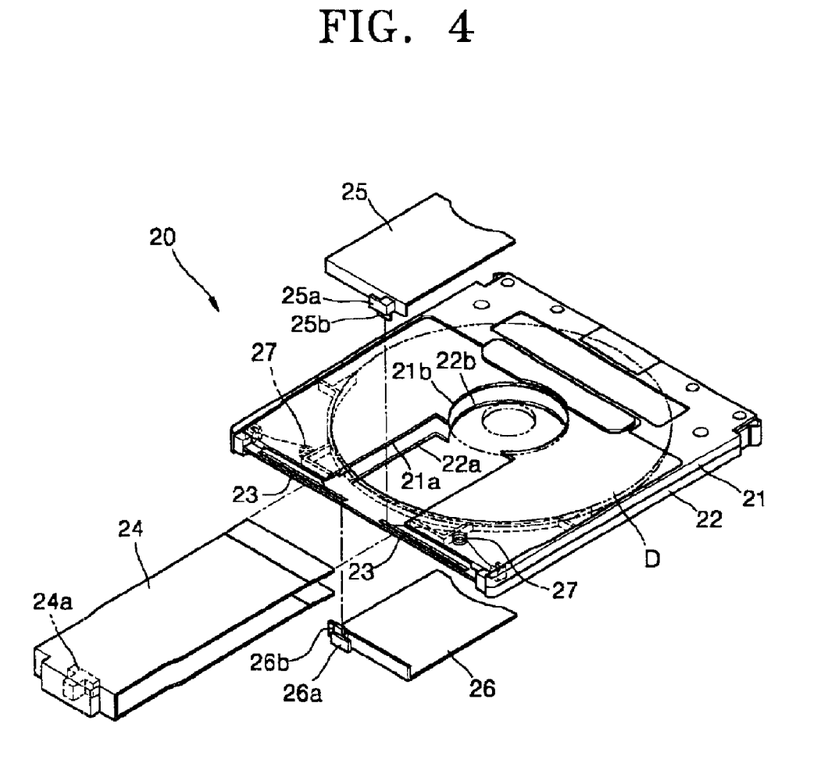
FIG. 4 is an exploded perspective view of a disc cartridge according to an embodiment of the present invention.

FIGS. 4 through 7 show a disc cartridge 20 according to an embodiment of the present invention. Referring to FIG. 4, the disc cartridge 20 includes upper and lower cases 21 and 22 which form an internal space to receive a disc D, and a shutter unit including shutters 24, 25, and 26 which selectively open and shut apertures 21a and 22a and receiving openings 21b and 22b formed on the corresponding upper and lower cases 21 and 22.

The shutter unit has a double-layer structure of an outer shutter 24 and inner shutters 25 and 26. In other words, the inner shutters 25 and 26 cover the apertures 21a and 22a formed on corresponding sides of the disc cartridge 20, and the outer shutter 24 is arranged over the inner shutters 25 and 26, and covers the apertures 21a and 22a and the receiving openings 21b and 22b.

The inner shutters 25 and 26 are connected to the outer shutter 24 by an interlock to be alternately opened with the outer shutter 24 according to sliding directions of the outer shutter 24. The interlock includes torsion springs 27 which provide an elastic force to the inner shutters 25 and 26 in directions to cover the apertures 21a and 22a and the receiving openings 21b and 22b, a locking projection 24a formed on the outer shutter 24, and interference projections 25a and 26a formed on the inner shutters 25 and 26.

The locking projection 24a is formed on a central portion of an inner wall of the outer shutter 24, and the interference projections 25a and 26a of the inner shutters 25 and 26 are located at both sides of the locking projection 24a to face each other. Accordingly, as the outer shutter 24 slides in a right direction of FIG. 4, the locking projection 24a pushes the interference projection 25a of the inner shutter 25 to open the inner shutter 25.

Figure 5:
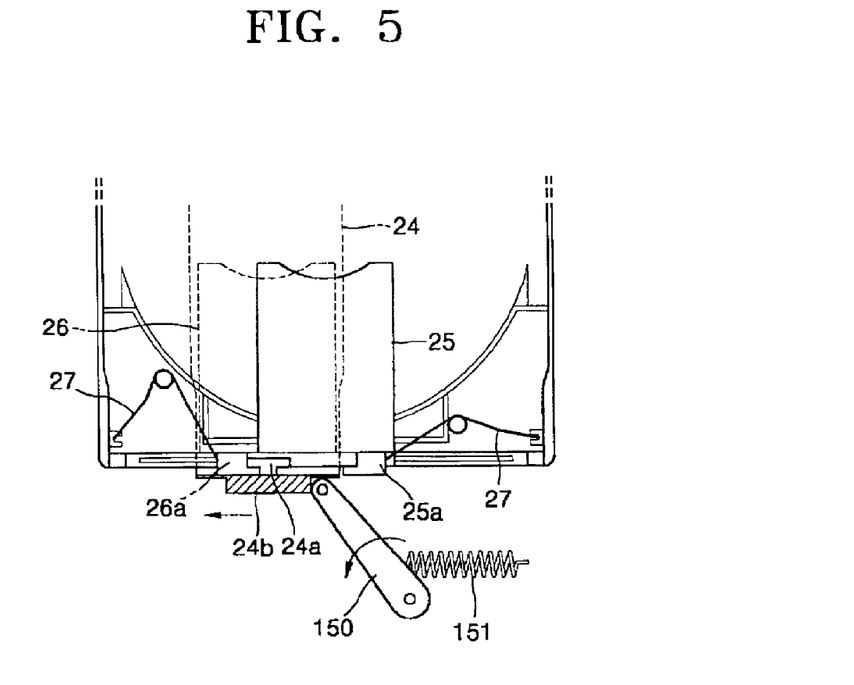
FIG. 5 is a partial view illustrating an opening operation of a shutter of the disc cartridge shown in FIG. 4.

As shown in FIG. 5, where the outer shutter 24 slides in the opposite direction, the interference projection 26a of the inner shutter 26 is pushed to open the inner shutter 26. In other words, only one of the inner shutters 25 and 26 is selectively opened while the other inner shutter 25 or 26 is maintained in a shut state according to the sliding directions of the outer shutter 24.

Referring back to FIG. 4, sliding guide projections 25b and 26b are formed on the corresponding interference projections 25a and 26a to be inserted into slots 23 on the disc cartridge 20 along sliding directions of the inner shutters 25 and 26.

Figure 6A:
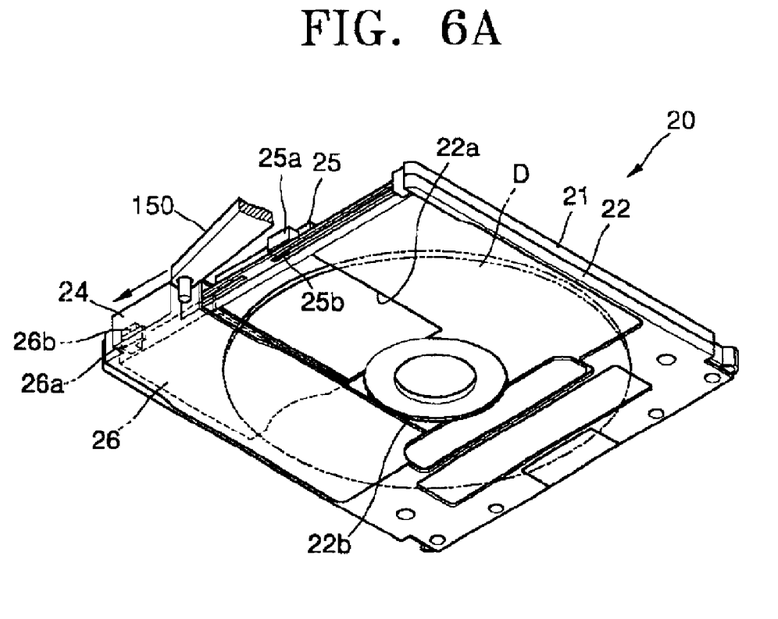
FIGS. 6A and 6B are perspective views illustrating lower and upper surfaces of the disc cartridge during the opening operation shown in FIG. 5.
Figure 6B:
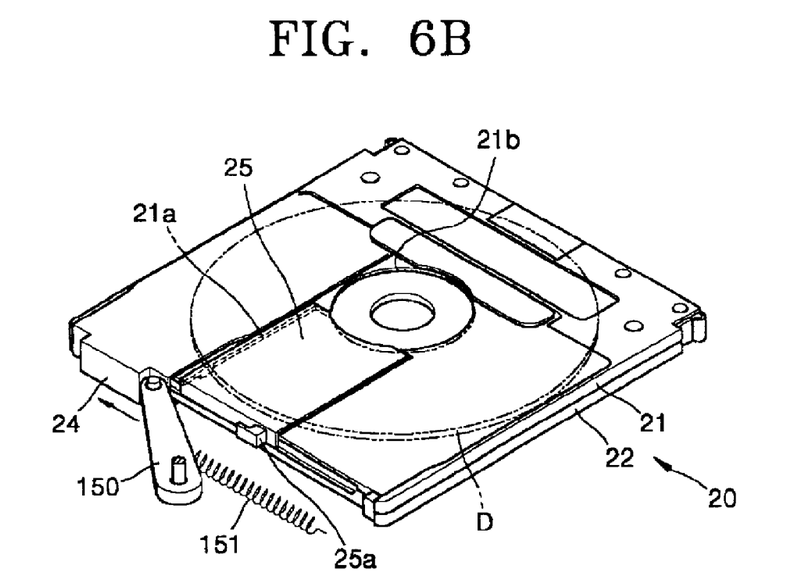

FIG. 5 shows that where the disc cartridge 20 is mounted on a tray 140 of FIG. 1 and inserted into an information recording apparatus 100 of FIG. 1, one end of an opening lever 150 is locked into a locking sill 24b of the outer shutter 24. As the lever 150 is rotated, the outer shutter 24 is thereby opened. In this case, the locking projection 24a of the outer shutter 24 pushes the interference projection 26a of the inner shutter 26 to simultaneously open the inner shutter 26. As a result, the aperture 22a on the lower case 22 is opened, as shown in FIG. 6A, and a pickup 130 of FIG. 1 can access one side of the disk D through the open aperture 22a. In contrast, the aperture 21a on the upper case 21 is shut by the inner shutter 25, as shown in FIG. 6B. That is, while the aperture 22a is open to allow the one side of the disc D to be used and accessed by the pickup 130 of FIG. 1, the opposite side of the disc D is sealed up, except for the receiving opening 21b.

However, the receiving opening 21b is not completely open because it is combined with a damper 120 of FIG. 1, which is almost the same size as the receiving opening 21b, according to the clamping of the disc D.

Therefore, where information is recorded on or reproduced from the disc D under the above-mentioned condition, dust that otherwise enters freely through the unused side of the disc D can be suppressed to a great extent. Compared to a conventional disc cartridge, the overall area of apertures of a disc cartridge of the present invention, which is open to the exterior during the information recording and reproducing operations, can be reduced by almost half. Accordingly, dust is less likely to enter into the disc cartridge 20 of the present invention, and errors can be prevented during a signal processing operation.

Where the disc cartridge 20 is ejected from the information recording apparatus 100 of FIG. 1, the opening lever 150 is returned to an original position, and the inner shutter 26 and the outer shutter 24 are returned to their original positions by the torsion spring 27 to shut the aperture 22a.

Figure 7:
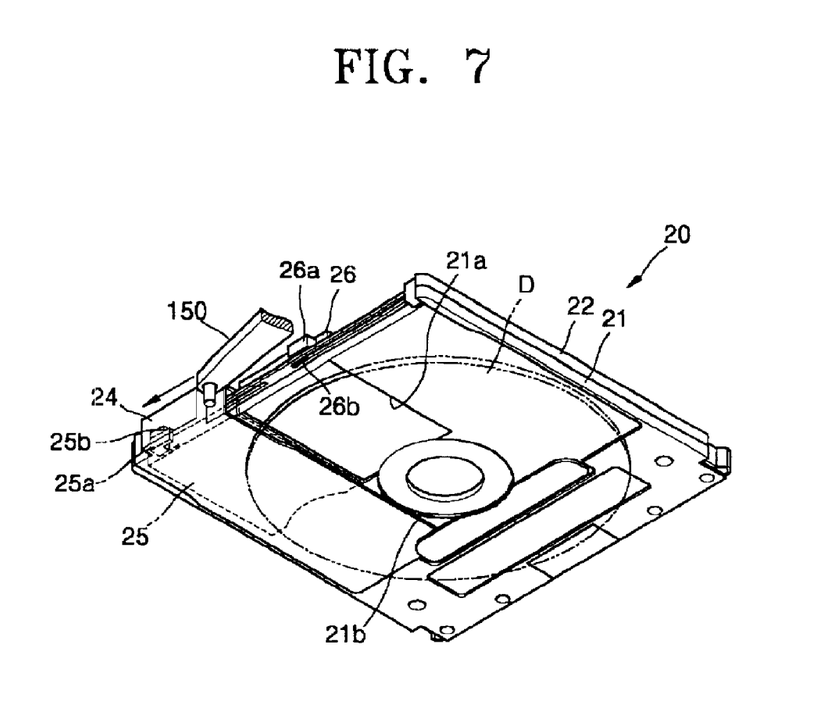
FIG. 7 is a perspective view illustrating an open state of the shutter in response to loading of the disc cartridge shown in FIG. 6A after turning the disc cartridge upside down.

To use the other side of the disc D, the disc cartridge 20 is first pulled out from the information recording apparatus 100 of FIG. 1, turned upside down, and inserted back into the information recording apparatus 100 of FIG. 1 with the inner shutter 25 facing downward. Accordingly, FIG. 7 shows that the outer shutter 24 is opened with the inner shutter 25 by the opening lever 150. In other words, although the opening lever 150, for example, always opens the outer shutter 24 in one direction, the other inner shutter 25 is open, because the disc cartridge 20 is turned upside down. Here, the other side of the disc D is accessed by the pickup 130 of FIG. 1 via the aperture 21a. As in the above, the unused side of the disc D, which is not accessed by the pickup 130, is sealed up by the inner shutter 26. Therefore, the dust that otherwise enters without restrictions through the unused side of the disc D can be suppressed.

With the present invention, both sides of the disc D can be used. However, dust can be prevented from entering through an aperture on the unused side of the disc D.

A disc cartridge according to the present invention selectively and individually opens and shuts apertures formed on the disc cartridge. The disc cartridge includes a shutter unit having a double-layer structure of an outer shutter and inner shutters. The outer shutter opens one of the inner shutters corresponding to a side of a disc being accessed. Thus, as compared to a conventional disc cartridge, the area of the apertures of the disc cartridge of the present invention, which is exposed to the exterior during information recording and reproducing operations, can be reduced by almost half. Accordingly, dust is less likely to enter into the disc cartridge.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A disc cartridge for receiving a disc, comprising:
   a case which receives the disc; and
   a shutter unit which selectively opens and closes apertures formed on the case according to sliding directions of the shutter unit, wherein the shutter unit comprises a double-layer structure of inner shutters and an outer shutter.

2. The disc cartridge of claim 1, wherein the apertures allow access to the disc, and in response to one of the apertures being open, the other aperture remains closed.

3. The disc cartridge of claim 1, wherein:
   the inner shutters are arranged over the case to open and close the corresponding apertures, and
   the outer shutter is arranged over the inner shutters, and moves the inner shutters alternately to open a corresponding one of the apertures according to the sliding directions.

4. The disc cartridge of claim 3, wherein in response to one of the apertures being opened by a corresponding one of the inner shutters, the other aperture remains closed by the other inner shutter.

5. The disc cartridge of claim 3, further comprising receiving openings formed on the case which allow the disc to be clamped, wherein the outer shutter selectively covers the receiving openings according to the sliding directions.

6. The disc cartridge of claim 3, further comprises an interlock unit which slideably connects the outer shutter to the inner shutters.

7. The disc cartridge of claim 6, wherein the interlock unit comprises:
at least one elastic member which elastically biases the inner shutters to normally close the apertures;
a locking projection formed on the outer shutter; and
interference projections formed on the corresponding inner shutters to face each other with the locking projection therebetween, wherein the interference projections are pushed and moved by the locking projection in response to sliding of the outer shutter.

8. The disc cartridge of claim 7, further comprising:
slots formed on the case along sliding directions of the inner shutters; and
sliding guide projections formed on the corresponding interference projections, which slide along the corresponding slots.

9. A disc cartridge for receiving a disc, comprising:
a case which receives the disc; and
a shutter unit which opens and closes apertures formed on corresponding sides of the case, wherein the shutter unit comprises:
inner shutters mounted on the case to open and close the corresponding apertures, and
an outer shutter arranged on the inner shutters which is slideably connected to the inner shutters by an interlock, and selectively opens the inner shutters according to sliding directions of the shutter unit.

10. The disc cartridge of claim 9, wherein the interlock comprises:
elastic members which elastically bias the corresponding inner shutters to normally close the apertures;
a locking projection formed on the outer shutter; and
interference projections formed on the corresponding inner shutters to face each other with the locking projection therebetween, wherein the interference projections are pushed and moved by the locking projection in response to sliding of the outer shutter.

11. The disc cartridge of claim 10, further comprising:
slots formed on the case along sliding directions of the inner shutters; and
sliding guide projections formed on the corresponding interference projections, which slide along the corresponding slots.

12. The disc cartridge of claim 9, wherein in response to one of the apertures being opened by a corresponding one of the inner shutters, the other aperture remains closed by the other inner shutter.

13. The disc cartridge of claim 9, wherein:
the outer shutter normally closes the inner shutters to close the apertures in response to the shutter unit being in an original position,
the outer shutter moves one of the inner shutters to open only a corresponding one of the apertures in response to the shutter unit being moved in one direction, and
the outer shutter moves the other one of the inner shutters to open only the other corresponding one of the apertures in response to the shutter unit being moved in another direction.

14. A disc cartridge for receiving a disc, comprising:
a case which receives the disc;
apertures formed on the case; and
a shutter unit which selectively opens and closes the apertures, individually, according to sliding directions of the shutter unit,
wherein the shutter unit includes inner shutters which slideably cover the apertures.

15. The disc cartridge of claim 14, wherein the shutter unit comprises:
an outer shutter which slides in the sliding directions to alternately move the inner shutters to open and close a corresponding one of the apertures.

16. The disc cartridge of claim 15, wherein in response to the one of the apertures being opened, the other one of the apertures remains closed.

17. The disc cartridge of claim 15, further comprising:
a locking projection formed on the outer shutter; and
interference projections formed on the corresponding inner shutters to face opposite sides of the locking projection, wherein the interference projections are alternately pushed by the locking projection to open and close the corresponding one of the apertures according to the sliding directions of the outer shutter.

18. A disc cartridge for receiving a disc, comprising:
a case which receives the disc;
apertures formed on the case which allow access to the disc;
inner shutters which movably cover the corresponding apertures; and
an outer shutter which opens one of the inner shutters corresponding to a side of the disc being accessed.

19. The disc cartridge of claim 18, wherein the remaining inner shutters stays closed.

20. The disc cartridge of claim 18, further comprising an interlock which movably connects the outer shutter to the inner shutters, wherein the inner shutters alternately opens with the outer shutter according to moving directions of the outer shutter.

21. The disc cartridge of claim 20, wherein the interlock comprises:
a locking projection formed on the outer shutter; and
interference projections formed on the corresponding inner shutters to face opposite sides of the locking projection, wherein the interference projections are correspondingly pushed by the locking projection to open the corresponding apertures according to the moving directions of the outer shutter.

22. A disc cartridge for receiving a disc, comprising:
a case which receives the disc;
apertures formed on the case which allow access to the disc; and
a shutter unit which alternately covers the apertures, according to sliding directions of the shutter unit, to open only one aperture at a time,
wherein the shutter unit normally closes the apertures, and
wherein the shutter unit includes inner shutters which slideably cover the apertures.

* * * * *